(12) United States Patent
Odate

(10) Patent No.: US 9,108,560 B2
(45) Date of Patent: Aug. 18, 2015

(54) SEAT BELT FAILURE WARNING APPARATUS

(71) Applicant: HONDA MOTOR CO., LTD., Minato-ku, Tokyo (JP)

(72) Inventor: Shotaro Odate, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/832,819

(22) Filed: Mar. 15, 2013

(65) Prior Publication Data

US 2013/0278409 A1  Oct. 24, 2013

(30) Foreign Application Priority Data

Apr. 19, 2012  (JP) .................................. 2012-095924

(51) Int. Cl.
*B60Q 1/00* (2006.01)
*B60R 22/48* (2006.01)

(52) U.S. Cl.
CPC . *B60Q 1/00* (2013.01); *B60R 22/48* (2013.01); *B60R 2022/4816* (2013.01); *B60R 2022/4866* (2013.01)

(58) Field of Classification Search
CPC .. B60Q 1/00; B60R 2022/4866; B60R 22/48; B60R 2022/4816; B60K 35/00
USPC ........................................................ 180/268
See application file for complete search history.

(56) References Cited

U.S. PATENT DOCUMENTS 3,864,668 A * 2/1975 Bickford ........................ 180/268
4,885,566 A * 12/1989 Aoki et al. .................. 340/457.1
5,612,623 A * 3/1997 Watanabe et al. ............. 324/549
6,211,793 B1 * 4/2001 Smithson ...................... 340/665
7,637,536 B2 * 12/2009 Delventhal et al. ........... 280/806

(Continued)

FOREIGN PATENT DOCUMENTS

EP  1 457 397 A1  9/2004
JP  H04-362445 A  12/1992

(Continued)

OTHER PUBLICATIONS

Japanese Office Action, with a mailing date of Feb. 25, 2014, issued in the corresponding JP Patent Application 2012-095924, with the English translation thereof.

(Continued)

*Primary Examiner* — Ojiako Nwugo
(74) *Attorney, Agent, or Firm* — Carrier Blackman & Associates, P.C.; Joseph P. Carrier; Jeffrey T. Gedeon

(57) ABSTRACT

The seat belt failure warning apparatus is disposed with a buckle switch that detects wearing of a webbing, a rotation sensor that detects a drawing-out amount of the webbing, and a liquid crystal display that switchingly displays a plurality of alarm information. A controller is disposed with a failure determination unit that determines whether the seat belt device has had a failure or not, and a control unit that controls display of the liquid crystal display. When the buckle switch is OFF and drawing-out of the webbing is detected by the rotation sensor after the failure determination unit has determined the seat belt device has had a failure, failure information of the seat belt which indicates that the seat belt device has had a failure as a determination result by the failure determination unit is displayed on the liquid crystal display regardless of a display priority of alarm information.

7 Claims, 5 Drawing Sheets

(56) References Cited

U.S. PATENT DOCUMENTS

| | | |
|---|---|---|
| 8,090,505 B2 * | 1/2012 | Takemura .................. 701/46 |
| 2008/0191458 A1 * | 8/2008 | Midorikawa ................ 280/807 |
| 2011/0278905 A1 * | 11/2011 | Ikeda ........................ 297/475 |

FOREIGN PATENT DOCUMENTS

| | | | |
|---|---|---|---|
| JP | 2001-130378 A | 5/2001 | |
| JP | 2002-260119 A | 9/2002 | |
| JP | 2003-160024 A | 6/2003 | |
| JP | 2007-099046 A | 4/2007 | |
| JP | 2008-247358 A | 10/2008 | |
| JP | 2008247358 | * 10/2008 | |

OTHER PUBLICATIONS

Extended European Search Report, issued in the corresponding EP application 13160140.3, mailing date Jul. 18, 2013.

* cited by examiner

SEAT BELT FAILURE WARNING APPARATUS

Priority is claimed on Japanese Patent Application No. 2012-95924, filed on Apr. 19, 2012, the contents of which are incorporated herein by reference.

BACKGROUND OF THE INVENTION

1. Field of the Invention

The present invention relates to a seat belt failure warning apparatus that informs an occupant of a failure of a seat belt device.

2. Description of Related Art

A seat belt device equipped in a vehicle is known that drives a reel wound by a webbing with a motor. In this seat belt device, the motor is controlled by a controller based on information from various sensors, and drawing-in of the webbing in the event of an emergency, winding up of slack in the webbing, wind-up storing of the webbing, and the like are automatically performed.

In the above-mentioned seat belt device, various behaviors can be precisely controlled by electric control, but in the event a failure occurs in the system, it is necessary to quickly inform the occupant thereof.

Therefore, a seat belt device has been developed which includes a failure determination unit that determines whether the system has had a failure or not, and a failure warning device that informs the occupant of the failure, in the event the failure determination unit determines the system has had a failure (for example, refer to Japanese Unexamined Patent Application Publication No. 2008-247358).

SUMMARY OF THE INVENTION

The failure warning device of the seat belt device according to Japanese Unexamined Patent Application Publication No. 2008-247358 informs the occupant of a failure of the seat belt device by lighting up an alarm light on an indicator when the failure determination unit determines the seat belt device has had a failure.

However, in recent years, a so-called multiple information display that switchingly displays a plurality of information at predetermined time intervals on a liquid crystal display may be used as a display device.

When informing the occupant of a failure of the seat belt device using such a multi-informational display, there is a possibility that the occupant may not instantly notice a failure of the seat belt device, because information is switchingly displayed on the liquid crystal display according to a predetermined priority.

An object of aspects of the present invention is to provide a seat belt failure warning apparatus that can reliably inform an occupant of a failure of a seat belt.

In order to achieve the above object, a seat belt failure warning apparatus according to aspects of the present invention adopts configurations described below.

(1) An aspect of the present invention is a seat belt failure warning apparatus including a wearing state detection section that detects wearing or non-wearing of a webbing of a seat belt device; a drawing-out amount detection section that detects a drawing-out amount of the webbing; a failure determination unit that determines whether the seat belt device has had a failure or not; a display section that switchingly displays a variety of information including failure information of the seat belt device which indicates that the seat belt device has had a failure as a determination result by the failure determination unit; and a control unit that controls display of the display section, wherein when the wearing state detection section detects non-wearing of the webbing and the drawing-out amount detection section detects drawing-out of the webbing after the failure determination unit determines the seat belt device has had a failure, the control unit causes the display section to display failure information of the seat belt device regardless of a display priority of information.

Thereby, when drawing-out of the webbing for wearing occurs after the seat belt device has had a failure, failure information of the seat belt device is displayed on the display section regardless of the display priority of information.

(2) In the aspect of (1) described above, the seat belt failure warning apparatus may further include an alarm sound emitting section that emits an alarm sound, wherein when the wearing state detection section detects non-wearing of the webbing and the drawing-out amount detection section detects start of drawing-out of the webbing from an initial position after the failure determination unit determines the seat belt device has had a failure, the control unit may command the alarm sound emitting section to output an alarm sound.

Thereby, when drawing-out of the webbing for wearing is started after the seat belt device has had a failure, the alarm sound emitting section emits an alarm sound.

(3) In the aspect of (1) or (2) described above, when the wearing state detection section detects non-wearing of the webbing and the drawing-out amount detection section detects drawing-out of the webbing after the failure determination unit determines the seat belt device has had a failure, the control unit may cause the display section to display failure information of the seat belt device while changing a display profile of the failure information depending on a drawing-out amount of the webbing.

Thereby, when drawing-out of the webbing for wearing occurs after the seat belt device has had a failure, a display profile of failure information of the seat belt device, which is displayed on the display section, changes depending on the drawing-out amount of the webbing.

(4) In the aspect of any one of (1) to (3) described above, when the wearing state detection section detects wearing of the webbing after the failure determination unit determines the seat belt device has had a failure, the control unit may change the display priority of failure information of the seat belt device to the highest priority and may cause the display section to display the failure information of the seat belt device.

Thereby, when wearing of the webbing is detected after a failure of the seat belt device is detected, failure information of the seat belt device is changed to highest priority and is displayed on the display section.

According to the aspect of (1) described above, when drawing-out of the webbing for wearing occurs after a failure of the seat belt device happens, failure information of the seat belt device is displayed on the display section before other information regardless of the display priority of information. Thereby, it is possible to reliably notify the occupant of the failure of the seat belt device.

According to the aspect of (2) described above, when drawing-out of the webbing for wearing is started after a failure of the seat belt device is detected, the alarm sound emitting section emits an alarm sound. Thereby, it is possible to reliably direct the eyes of the occupant to the display section.

According to the aspect of (3) described above, when drawing-out of the webbing for wearing occurs after a failure of the seat belt device is detected, the display profile of failure information of the seat belt device, which is displayed on the display section, changes depending on the drawing-out amount of the webbing. Thereby, it is possible to reliably notify the occupant of the failure of the seat belt device.

According to the aspect of (4) described above, when wearing of the webbing is detected after a failure of the seat belt device is detected, failure information of the seat belt device becomes the highest display priority and is displayed on the display section.

Thereby, even if display information of the display section may be switched over to other information just before wearing of the webbing is completed, it is possible to reliably inform the occupant of the failure of the seat belt device just after wearing of the webbing has been completed.

DESCRIPTION OF THE EMBODIMENTS

Hereinafter, an embodiment of the present invention will be described with reference to the drawings.

Figure 1:
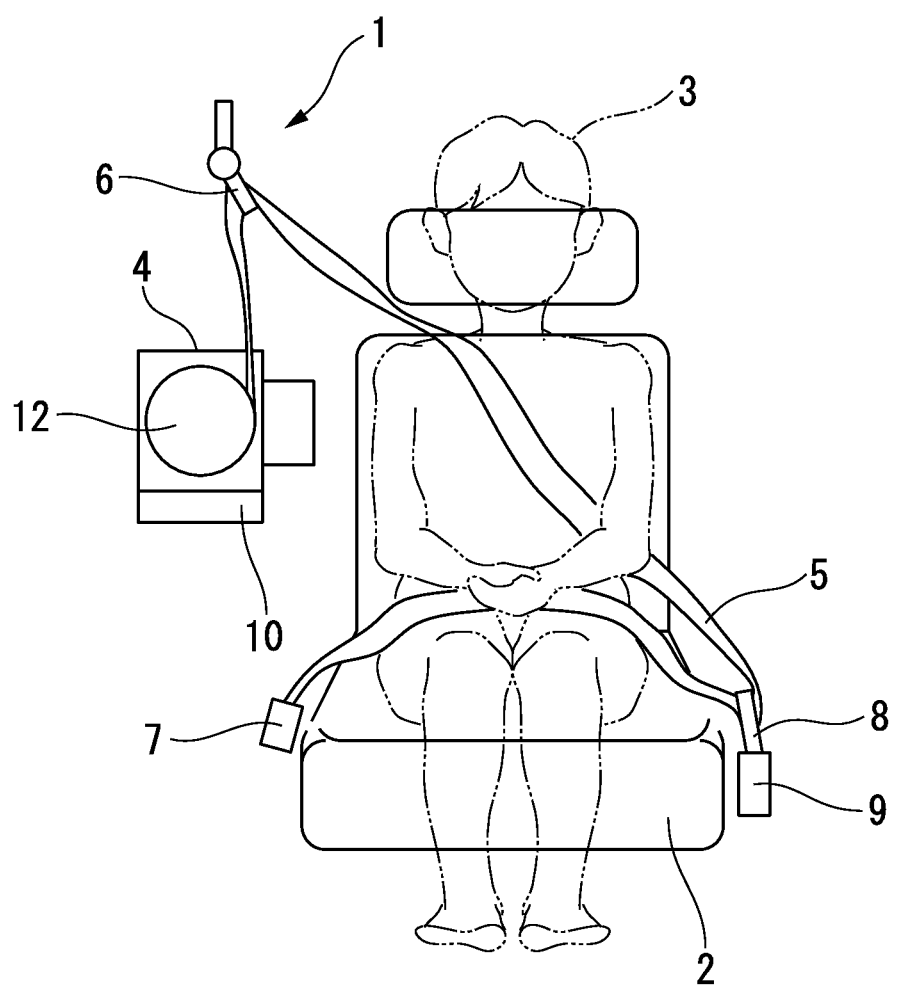
FIG. 1 is a schematic configuration illustration of a seat belt device according to an embodiment of the present invention.

FIG. 1 is an illustration presenting an overall schematic configuration of a seat belt device 1 according to the embodiment of the present invention, and the reference numeral 2 in the figure indicates a seat on which an occupant 3 sits down.

The seat belt device 1 in the embodiment is a so-called 3-point seat belt device, in which a webbing 5 is drawn out upward from a retractor 4 provided on a center pillar which is not shown in the figure, the webbing 5 is inserted into a through-anchor 6 which is supported on an upper portion side of the center pillar, and a distal end of the webbing 5 is fixed to a vehicle floor via an outer-anchor 7 on an outer side of a vehicle room with respect to the seat 2.

A tongue plate 8 is inserted into the webbing 5 between the through-anchor 6 and the outer-anchor 7, and the tongue plate 8 is detachably attached to a buckle 9 which is fixed to the vehicle floor on an inner side of the vehicle body with respect to the seat 2.

The webbing 5 is rolled up in the retractor 4 in an initial state, and the occupant 3 draws out the tongue plate 8 with their hands and fixes it to the buckle 9. Thereby, the webbing 5 holds mainly a chest portion and an abdomen portion of the occupant 3 to the seat 2. In addition, the seat belt device 1 automatically performs roll-up of the webbing 5 by an electrically-operated motor 10 in case of emergencies, when a change of the action of a vehicle is large, or when storing the webbing 5 in the retractor 4, or the like.

Figure 2:
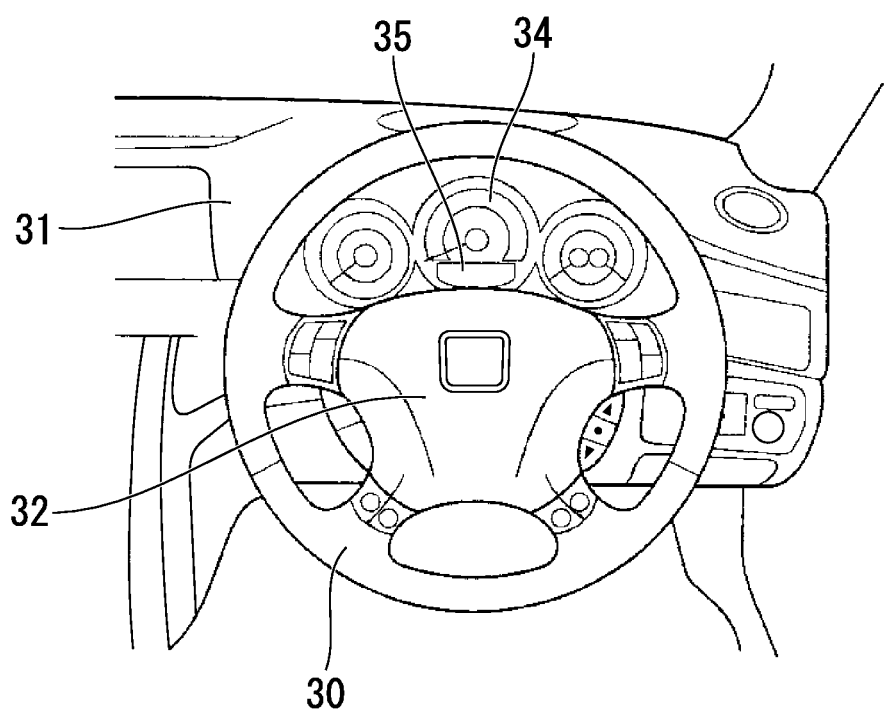
FIG. 2 is a front view of a front portion of a driving seat of a vehicle according to the embodiment of the present invention.

FIG. 2 is an illustration showing a front portion of a driving seat of a vehicle.

The driving seat is provided with a steering wheel 30, an instrument panel 31 is disposed in a front of the driving seat, and the steering wheel 30 is provided with a horn 32.

The instrument panel 31 is disposed with a meter display unit 34 consisting of a speedometer, a tachometer, or the like, and a liquid crystal display 35 that can switchingly display a large variety of information at given time intervals is disposed below the meter display unit 34. In the embodiment, the liquid crystal display 35 constitutes a display section that displays failure information when a failure happens to the seat belt device 1.

Figure 3:
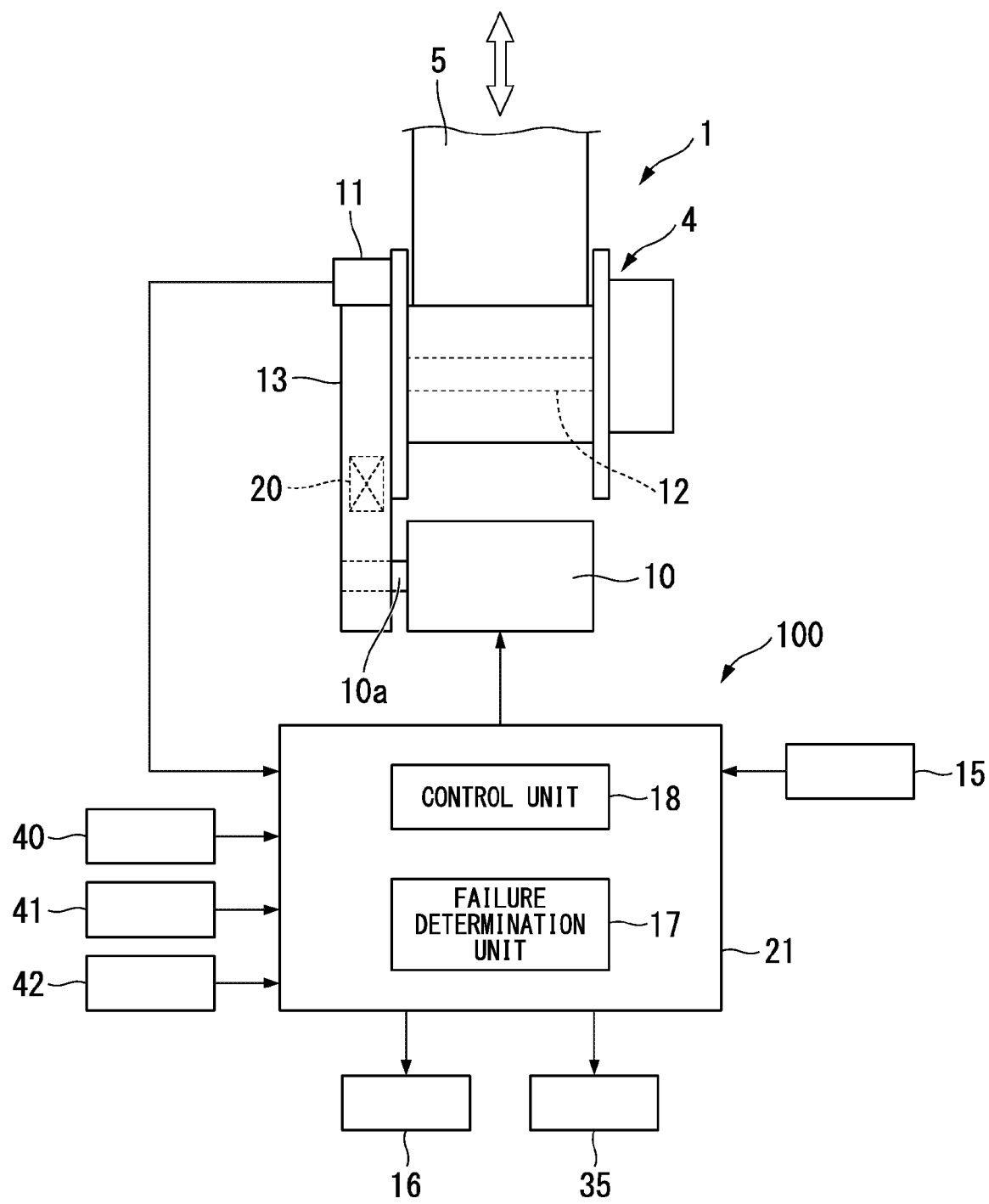
FIG. 3 is a schematic configuration illustration of a seat belt device according to the embodiment of the present invention.

FIG. 3 is a schematic configuration illustration to showing a function of the retractor 4 and a controller 21 of the seat belt device 1.

In the retractor 4, the webbing 5 is rolled up by a reel 12 that is rotatably supported by a casing (not shown in the figure) as shown in FIG. 3, and a shaft of the reel 12 protrudes out of a side of the casing. The reel 12 is connected to a rotation shaft 10a of the motor 10 via a power transmission mechanism 13 such that the reel 12 is movable in conjunction with the rotation shaft 10a. The power transmission mechanism 13 reduces the rotational speed of the motor 10 and transmits the rotation to the reel 12.

The retractor 4 is provided with a roll-up spring (not shown in the figure) that biases the reel 12 to a roll-up direction of the webbing such that a tensile force by the roll-up spring works on the webbing 5 in a state where the reel 12 and the motor 10 are separated by a clutch 20. The clutch 20 is turned on at a normal rotation of the motor 10, and is turned off at the start of a reverse rotation of the motor 10.

In addition, the retractor 4 is provided with a rotation sensor 11 (drawing-out amount detection section) that detects the rotation position of the reel 12.

The rotation sensor 11 includes, for example, a magnetic disk that is alternately magnetized with different magnetic poles along a circumferential direction and that rotates integrally with the reel 12, a pair of Hall elements that are disposed close to an outer perimeter portion of the magnetic disk, and a sensor circuit that processes a detection signal of the Hall elements, such that a pulse signal that is processed by the sensor circuit is output to the controller 21.

The pulse signal that is input to the controller 21 from the sensor circuit corresponding to the rotation of the reel 12 is used to detect the amount of rotation of the reel 12, the rotational speed, the rotation direction, and the like.

In other words, the controller 21 detects the amount of rotation of the reel 12 (a roll-up amount or a reel-out amount of the webbing 5) by counting the pulse signal, obtains the rotational speed of the reel 12 (the roll-up speed or the reel-out speed of the webbing 5) by calculating a rate of change of the pulse signal (frequency), and detects the rotation direction of the reel 12 by comparing the rises in the waveforms of the pulse signals from both of the Hall elements.

As shown in FIG. 3, a front and rear acceleration sensor 40 that detects acceleration in a front and rear direction of the vehicle, a transverse acceleration sensor 41 that detects acceleration in a right and left direction of the vehicle, and a yaw rate sensor 42 that detects an angular acceleration in a yaw direction of the vehicle, and the like, along with the rotation sensor 11, are connected to an input side of the controller 21.

In addition, a buckle switch 15 (wearing state detection section) which detects that the tongue plate 8 is engaged to the buckle 9, namely, that wearing of the webbing 5 has been completed, is connected to the input side of the controller 21.

On the other hand, the liquid crystal display 35 that is the display section, and an alarm sound emitting device 16 (alarm sound emitting section) such as an audio monitor that emits an alarm sound, are connected to an output side of the controller 21.

Moreover, the controller 21 includes a failure determination unit 17 that detects a failure such as a system failure of the seat belt device 1, and a control unit 18 that controls driving of the motor 10 and the display of the liquid crystal display 35.

The control unit 18 receives a detection signal from the front and rear acceleration sensor 40, the transverse acceleration sensor 41, the yaw rate sensor 42, the rotation sensor 11, the buckle switch 15, or the like, and drives the motor 10 to perform drawing-in of the webbing 5 in the event of an emergency, winding up of loose webbing, wind-up storing, and the like.

Furthermore, the control unit 18 outputs a control command to a display system of the liquid crystal display 35 in a condition described later as (a) or (b), after the failure determination unit 17 determines that the seat belt device 1 has had a failure.

In this embodiment, a seat belt failure warning apparatus 100 includes the controller 21 having the failure determination unit 17 and the control unit 18, the liquid crystal display 35, and the alarm sound emitting device 16.

Figure 4:
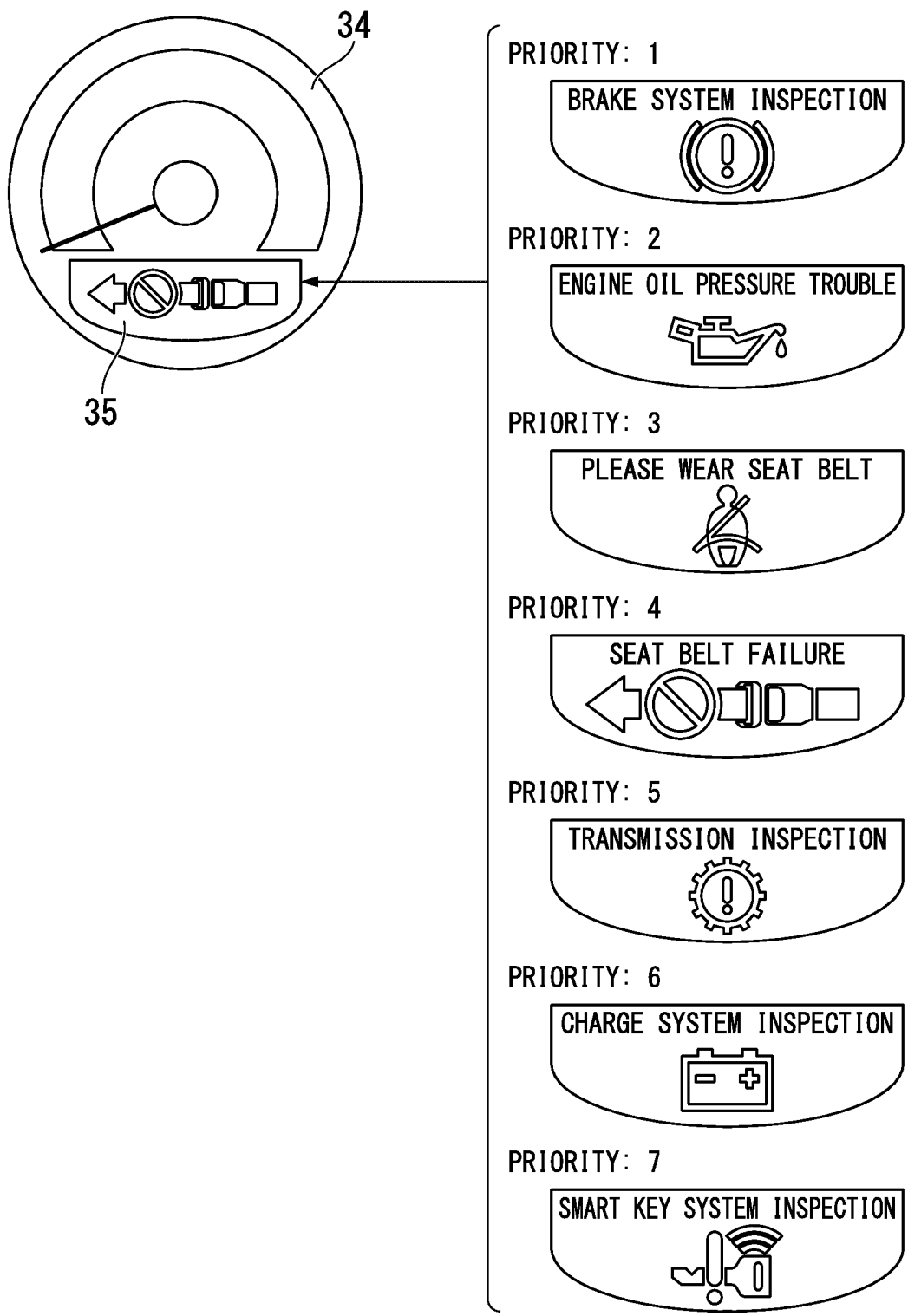
FIG. 4 is an illustration showing an example of a liquid crystal display of a vehicle according to the embodiment of the present invention.

FIG. 4 is an illustration presenting a display example of the liquid crystal display 35.

In the liquid crystal display 35, when there are a plurality of alarm information, the alarm information is sequentially switched to be displayed in accordance with a predetermined priority level of each alarm information. In the display system of the liquid crystal display 35, for example, the priority levels of different alarms are shown below.

Priority 1: Brake system inspection alarm
Priority 2: Engine oil pressure trouble alarm
Priority 3: Seat belt wearing alarm
Priority 4: Seat belt failure alarm
Priority 5: Transmission inspection alarm
Priority 6: Charge system inspection alarm
Priority 7: Smart key system inspection alarm Described below are conditions at which the control unit 18 outputs control commands to the liquid crystal display 35 after the failure determination unit 17 determines that the seat belt device 1 has had a failure, and specific control commands.

(a) In the case that drawing-out of the webbing 5 is detected based on a detection value of the rotation sensor 11 and the buckle switch 15 is not ON, the control unit 18 displays the seat belt failure alarm on the liquid crystal display 35 regardless of the display priority of other alarm information, and changes the display profile of the seat belt failure alarm depending on a drawing-out amount of the webbing 5.

The display profile includes, for example, brightness, color, motion, and the like.

(b) When the buckle switch 15 is switched ON, the control unit 18 changes the display priority of the seat belt failure alarm to the highest priority, first displays the seat belt failure alarm on the liquid crystal display 35, and then switches sequentially to other alarm information.

In addition, when the above condition (a) is satisfied and drawing-out of the webbing 5 is detected for the first time after an ignition switch is turned on, the control unit 18 outputs a command to the alarm sound emitting device 16 to emit an alarm sound for a predetermined time interval.

Figure 5:
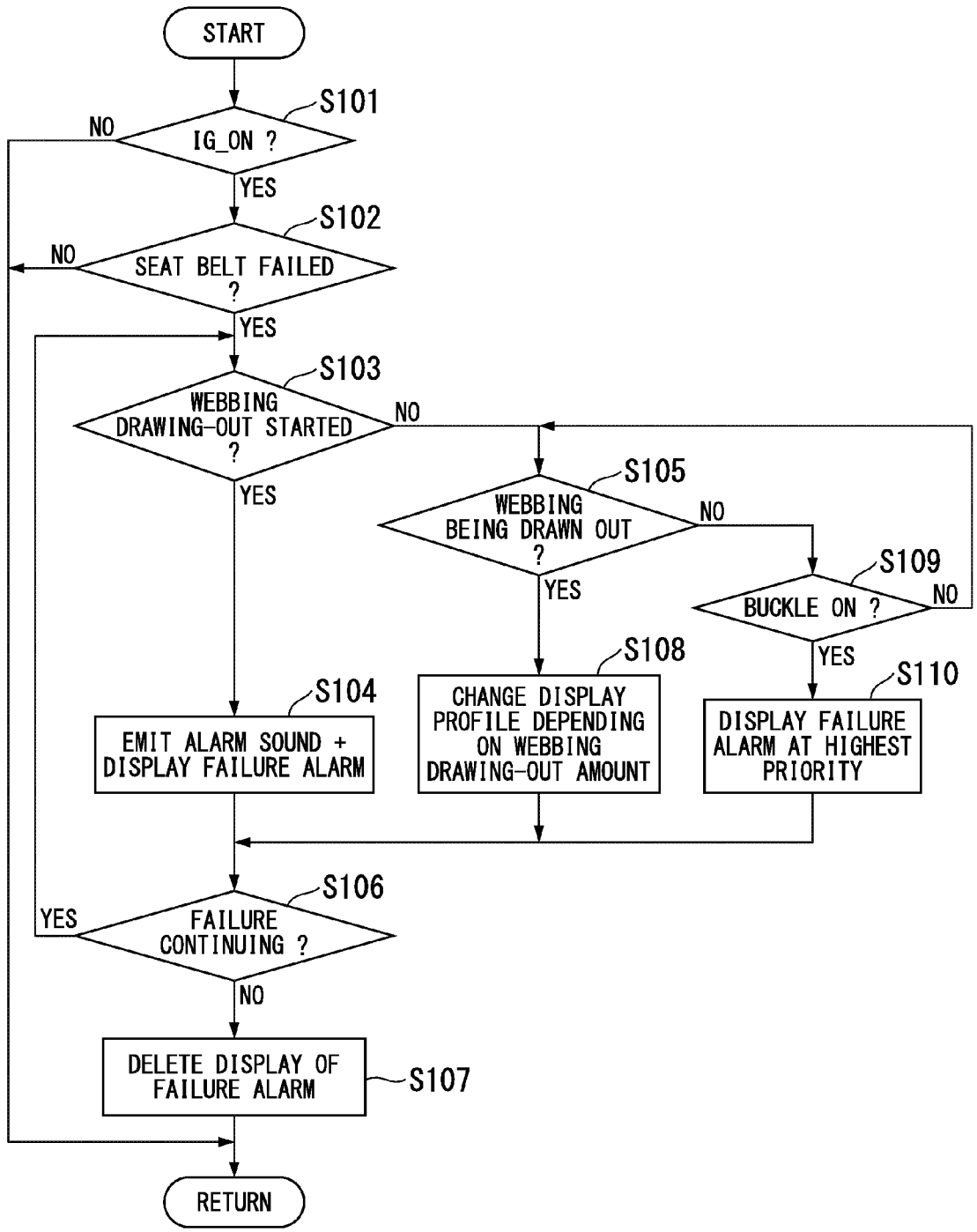
FIG. 5 is a flow chart presenting a control example of a seat belt failure warning apparatus according to the embodiment of the present invention.

Described below is an example of a specific control in the seat belt failure warning apparatus 100 referring to a flow chart shown in FIG. 5.

In a step S101, the routine determines whether the ignition switch (IG) is ON or not, and the routine proceeds to a next step S102 in case of ON, or the routine proceeds to RETURN in case of OFF.

In the step S102, the routine determines whether a failure determination of the seat belt device 1 has been made by the failure determination unit 17 or not, and the routine proceeds to a next step S103 when a failure determination has been made, or the routine proceeds to RETURN when a failure determination has not been made.

In the step S103, the routine determines whether drawing-out of the webbing 5 has started (drawing-out has been detected for the first time) or not, and the routine proceeds to a step S104 in case of YES, or the routine proceeds to a step S105 in case of NO.

In the step S104, an alarm sound is emitted by the alarm sound emitting device 16, and a seat belt failure alarm is displayed on the liquid crystal display 35.

In a next step S106, the routine determines whether the failure state is continuing or not (the failure determination by the failure determination unit 17 is continuing or not), and the routine returns to the step S103 in case of YES. On the other hand, in case of NO, the routine proceeds to a step S107, and the seat belt failure display on the liquid crystal display 35 is deleted.

In the step S105, the routine determines whether the webbing 5 is currently being drawn out or not, and the routine proceeds to a step S108 in case of YES, or the routine proceeds to a step S109 in case of NO.

In the step S108, brightness, color, movement, or the like, of the seat belt failure display on the liquid crystal display 35 is continuously changed depending on the drawing-out amount of the webbing 5.

On the other hand, in the step S109, the routine determines whether the buckle switch 15 is ON or not (whether wearing of the webbing 5 has been completed or not), and the routine proceeds to a step S110 in case of YES, or the routine returns to the step S105 in case of NO.

In the step S110, the display priority of the seat belt failure alarm that is displayed on the liquid crystal display 35 is changed to the highest priority, the seat belt failure alarm is first displayed on the liquid crystal display 35, and then other alarm information is sequentially switched to be displayed on the liquid crystal display 35.

Here, when drawing-out of the webbing 5 is stopped for more than a predetermined time interval at a step before the routine determines YES in the step S109, the display on the liquid crystal display 35 is set back to a normal switching display (display in which information is switched sequentially from the higher display priority information to the lower display priority one).

Specifically, just before the tongue plate 8 is put in the buckle 9, since the occupant performs an action to confirm the position of the buckle 9 by sight while keeping the drawing-out length of the webbing 5, the movement of the occupant's hands is stopped, and thus a possibility that the movement of the webbing 5 is stopped for more than a certain time interval is increased. Thereby, there is a high possibility that the display on the liquid crystal display 35 is set back to a normal switching display.

In this embodiment, when the tongue plate 8 is put in the buckle 9, the routine proceeds to the step S110 and the seat belt failure alarm is displayed at the highest priority on the liquid crystal display 35.

Thereby, even if other information is displayed on the liquid crystal display 35 until just before, the seat belt failure alarm meets the eye of the occupant who turns his/her face forward just after the tongue plate 8 is put in the buckle 9, and the occupant reliably notifies the seat belt failure.

As described above, in the seat belt failure warning apparatus 100, when drawing-out of the webbing 5 for wearing is detected after a failure of the seat belt device 1 is detected, failure information of the seat belt device is displayed on the liquid crystal display 35 prior to other information regardless of the display priority of alarm information. Thereby, it is possible to reliably notify the occupant of the failure of the seat belt device 1.

Specifically, in this embodiment, when start of drawing-out of the webbing 5 for wearing is detected after the failure of the seat belt device 1 is detected, the alarm sound emitting device 16 emits the alarm sound, together with the display of failure information of the seat belt device onto the liquid crystal display 35. Thereby, it is possible to reliably direct the eyes of the occupant to the liquid crystal display 35 at a time of the start of drawing-out of the webbing 5.

In addition, in this embodiment, when drawing-out of the webbing 5 for wearing is performed after the failure of the seat belt device 1 is detected, the display profile of failure information of the seat belt device is continuously changed depending on the drawing-out amount of the webbing 5. Thereby, it is possible to reliably notify the occupant of the failure of the seat belt device 1.

In addition, in the seat belt failure warning apparatus 100, when the buckle switch 15 is turned ON after the failure of the seat belt device 1 is detected, the display priority of failure information of the seat belt device is changed to the highest priority and is displayed on the liquid crystal display 35. Thereby, it is easy for the occupant to be notified of the failure of the seat belt device just after wearing of the webbing 5.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. A seat belt failure warning apparatus comprising:
   a wearing state detection section that detects wearing or non-wearing of a webbing of a seat belt device;
   a drawing-out amount detection section that detects a drawing-out amount of the webbing;
   a failure determination unit that determines whether the seat belt device has had a failure or not;
   a display section that switchingly displays a variety of information including failure information of the seat belt device which indicates that the seat belt device has had a failure as a determination result by the failure determination unit; and
   a control unit that controls display of the display section,
   wherein when the wearing state detection section detects non-wearing of the webbing and the drawing-out amount detection section detects drawing-out of the webbing after the failure determination unit determines the seat belt device has had a failure, the control unit causes the display section to display failure information of the seat belt device regardless of a display priority of information.

2. The seat belt failure warning apparatus according to claim 1, further comprising an alarm sound emitting section that emits an alarm sound,
   wherein when the wearing state detection section detects non-wearing of the webbing and the drawing-out amount detection section detects start of drawing-out of the webbing from an initial position after the failure determination unit determines the seat belt device has had a failure, the control unit commands the alarm sound emitting section to output an alarm sound.

3. The seat belt failure warning apparatus according to claim 2,
   wherein when the wearing state detection section detects non-wearing of the webbing and the drawing-out amount detection section detects drawing-out of the webbing after the failure determination unit determines the seat belt device has had a failure, the control unit causes the display section to display failure information of the seat belt device while changing a display profile of the failure information depending on a drawing-out amount of the webbing.

4. The seat belt failure warning apparatus according to claim 2,
   wherein when the wearing state detection section detects wearing of the webbing after the failure determination unit determines the seat belt device has had a failure, the control unit changes a display priority of failure information of the seat belt device to the highest priority and causes the display section to display the failure information of the seat belt device.

5. The seat belt failure warning apparatus according to claim 1,
   wherein when the wearing state detection section detects non-wearing of the webbing and the drawing-out amount detection section detects drawing-out of the webbing after the failure determination unit determines the seat belt device has had a failure, the control unit causes the display section to display failure information of the seat belt device while changing a display profile of the failure information depending on a drawing-out amount of the webbing.

6. The seat belt failure warning apparatus according to claim 5,
   wherein when the wearing state detection section detects wearing of the webbing after the failure determination unit determines the seat belt device has had a failure, the control unit changes a display priority of failure information of the seat belt device to the highest priority and causes the display section to display the failure information of the seat belt device.

7. The seat belt failure warning apparatus according to claim 1,
   wherein when the wearing state detection section detects wearing of the webbing after the failure determination unit determines the seat belt device has had a failure, the control unit changes a display priority of failure information of the seat belt device to the highest priority and causes the display section to display the failure information of the seat belt device.

* * * * *